(12) United States Patent
Noh

(10) Patent No.: US 10,237,492 B2
(45) Date of Patent: Mar. 19, 2019

(54) IMAGE SENSOR CIRCUIT REMOVING FLICKER AND CAMERA DEVICE INCLUDING THE SAME

(71) Applicant: SAMSUNG ELECTRONICS CO., LTD., Suwon-si, Gyeonggi-do (KR)

(72) Inventor: Yo-Hwan Noh, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 61 days.

(21) Appl. No.: 15/361,643

(22) Filed: Nov. 28, 2016

(65) Prior Publication Data

US 2017/0171450 A1  Jun. 15, 2017

(30) Foreign Application Priority Data

Dec. 15, 2015  (KR) .................. 10-2015-0179187

(51) Int. Cl.
  *H04N 5/235*  (2006.01)
(52) U.S. Cl.
  CPC ............................. *H04N 5/2357* (2013.01)
(58) Field of Classification Search
  CPC .................................................. H04N 5/2357
  See application file for complete search history.

(56) References Cited

U.S. PATENT DOCUMENTS

| | | | |
|---|---|---|---|
| 6,580,457 B1 | 6/2003 | Armstrong et al. | |
| 7,187,405 B2 | 3/2007 | Poplin et al. | |
| 7,471,316 B2* | 12/2008 | Takahashi | H04N 5/235 348/226.1 |
| 7,821,547 B2 | 10/2010 | Suzuki | |
| 8,279,303 B2 | 10/2012 | Niikura | |
| 8,451,345 B2 | 5/2013 | Fuchigami | |
| 8,711,245 B2 | 4/2014 | Kinrot et al. | |
| 8,804,003 B2 | 8/2014 | Cami | |
| 9,055,228 B2* | 6/2015 | Kinoshita | H04N 5/2353 |
| 2003/0030744 A1* | 2/2003 | Baer | H04N 5/217 348/370 |
| 2006/0055823 A1* | 3/2006 | Kinoshita | H04N 5/2357 348/511 |
| 2006/0158531 A1* | 7/2006 | Yanof | H04N 5/2351 348/226.1 |
| 2007/0013785 A1* | 1/2007 | Kinoshita | H04N 5/235 348/222.1 |
| 2009/0128683 A1* | 5/2009 | Matsumoto | H04N 5/23212 348/345 |
| 2011/0205394 A1* | 8/2011 | Fuchigami | H04N 5/2357 348/226.1 |

(Continued)

*Primary Examiner* — Nicholas G Giles
(74) *Attorney, Agent, or Firm* — F. Chau & Associates, LLC

(57) ABSTRACT

An image sensor circuit includes an image sensor, a flicker detector and a flicker compensator. The image sensor generates frame data for a plurality of successive frames. The flicker detector determines a representative value of the frame data for each of the plurality of successive frames and generates a flicker detection signal that is activated when the determined representative values of the generated frame data show periodicity between a minimum value and a maximum value. The flicker compensator generates compensated frame data by compensating the frame data based on the determined representative values and a predetermined reference value when the flicker detection signal is activated.

20 Claims, 10 Drawing Sheets

(56) References Cited

U.S. PATENT DOCUMENTS

| | | | |
|---|---|---|---|
| 2012/0194698 A1* | 8/2012 | Cami | H04N 5/2353 |
| | | | 348/226.1 |
| 2013/0286245 A1 | 10/2013 | Samadani | |
| 2015/0146998 A1* | 5/2015 | Fuchigami | H04N 5/2357 |
| | | | 382/275 |

* cited by examiner

IMAGE SENSOR CIRCUIT REMOVING FLICKER AND CAMERA DEVICE INCLUDING THE SAME

CROSS-REFERENCE TO RELATED APPLICATION

This U.S. Non-provisional application claims priority under 35 USC § 119 to Korean Patent Application No. 10-2015-0179187, filed on Dec. 15, 2015, in the Korean Intellectual Property Office (KIPO), the disclosure of which is incorporated by reference in its entirety herein.

TECHNICAL FIELD

Exemplary embodiments of the present invention relate generally to semiconductor devices, and more particularly to an image sensor circuit removing flicker between frames that is caused when a sampling frequency of the image sensor circuit is greater than a frequency of incident light and a camera device including the image sensor circuit.

DISCUSSION OF THE RELATED ART

An image sensor circuit may operate at a particular frequency (e.g., 120 Hz, 240 Hz or 480 Hz) that is higher than a frequency (e.g., 60 Hz) of incident light. An incident light may also operate at a particular frequency. Since the intensity of the incident light varies within a period of the incident light, brightness fluctuation may be caused between the frame data generated by the image sensor circuit if the image sensor circuit operates at a frequency higher than the frequency of the incident light. This brightness fluctuation between frames may create a flicker when a user watches a video captured by the image sensor circuit.

SUMMARY

Some exemplary embodiments of the present invention may provide an image sensor circuit for detecting flicker between frames that is caused when a sampling frequency of the image sensor circuit is greater than a frequency of incident light and compensating the frame data to a predetermined level when the flicker is detected.

Some exemplary embodiments of the present invention may provide a camera device for capturing a set of image frames and detecting flicker between the frames that is caused when a sampling frequency of an included image sensor circuit is greater than a frequency of incident light and compensating the frame data to a predetermined level when the flicker is detected.

According to exemplary embodiments of the present invention, an image sensor circuit includes a sensor, a flicker detector and a flicker compensator. The sensor periodically generates frame data corresponding to incident light. The flicker detector outputs a representative value of the frame data as a current value and generates a flicker detection signal that is activated when the representative value of previous frame data exhibits a periodic change between a minimum value and a maximum value. The flicker compensator generates compensated frame data by compensating the frame data based on the current value and a predetermined reference value when the flicker detection signal is activated.

The image sensor circuit may further include a flicker compensation verifier configured to generate a flicker reduction rate by comparing a representative value of the compensated frame data and the predetermined reference value.

The flicker reduction rate may be inversely proportional to a difference between the predetermined reference value and the representative value of the compensated frame data.

An intensity of the incident light may change with a first period, the sensor may output the frame data with a second period and the second period may be set such that the first period has a duration that is a multiple of the duration of the second period.

The flicker compensator may include a compensation value calculator configured to calculate a gain and an offset level compensation value that satisfy PDRV=CV*G+PED where PDRV is the predetermined reference value, CV is the current value, G is the gain and PED is the offset level compensation value. The flicker compensator may further include a compensation value applier configured to output R, G and B pixel data within the compensated frame data by multiplying the gain with each of R, G and B data included in the frame data and then adding the offset level compensation value.

The predetermined reference value may correspond to the maximum value, the minimum value or a value between the maximum value and the minimum value.

The predetermined reference value may be between 90% of the maximum value and 95% of the maximum value.

The frame data may include portion data and the representative value may correspond to an average value of the portion data.

The frame data may include first portion data through N-th portion data, where N is an integer greater than 1, and the representative value may correspond to an average value of a first average value of the first portion data through an N-th average value of the N-th portion data.

The frame data may include portion data and the representative value may correspond to a median value of the portion data.

The frame data may include first portion data through N-th portion data, where N is an integer greater than 1, and the representative value may correspond to a median value of a first median value of the first portion data through an N-th median value of the N portion data.

The flicker compensator may output the frame data as the compensated frame data when the flicker detection signal is deactivated.

According to exemplary embodiments of the present invention, a camera device includes a sensor configured to periodically generate frame data corresponding to incident light. A flicker detector is configured to output a representative value of the frame data as a current value and generate a flicker detection signal that is activated when the representative value of previous frame data is changed periodically between a minimum value and a maximum value. A flicker compensator is configured to generate compensated frame data by compensating the frame data based on the current value and a predetermined reference value when the flicker detection signal is activated. A storage memory is configured to store the compensated frame data.

An intensity of the incident light may change with a first period and the sensor may output the frame data with a second period. The second period may be set such that the duration of the first period is a multiple of the duration of the second period.

The flicker compensator may include a compensation value calculator configured to calculate a gain and an offset level compensation value that satisfy PDRV=CV*G+PED where PDRV is the predetermined reference value, CV is the current value, G is the gain and PED is the offset level compensation value, and the flicker compensator may further include a compensation value applier configured to output R, G and B pixel data included in the compensated frame data by multiplying the gain with each of R, G and B data included in the frame data and then adding the offset level compensation value.

The image sensor circuit and the camera device, according to exemplary embodiments of the present invention, may detect the flicker between the frames based on the periodical change of the representative value of the frame date when the image sensor circuit operates at a frequency higher than the frequency of the incident light and compensate the frame data to a predetermined brightness to remove the flicker between the frames.

BRIEF DESCRIPTION OF THE DRAWINGS

Exemplary embodiments of the present disclosure will be more clearly understood from the following detailed description taken in conjunction with the accompanying drawings, in which.

DETAILED DESCRIPTION OF THE EMBODIMENTS

Figure 1:
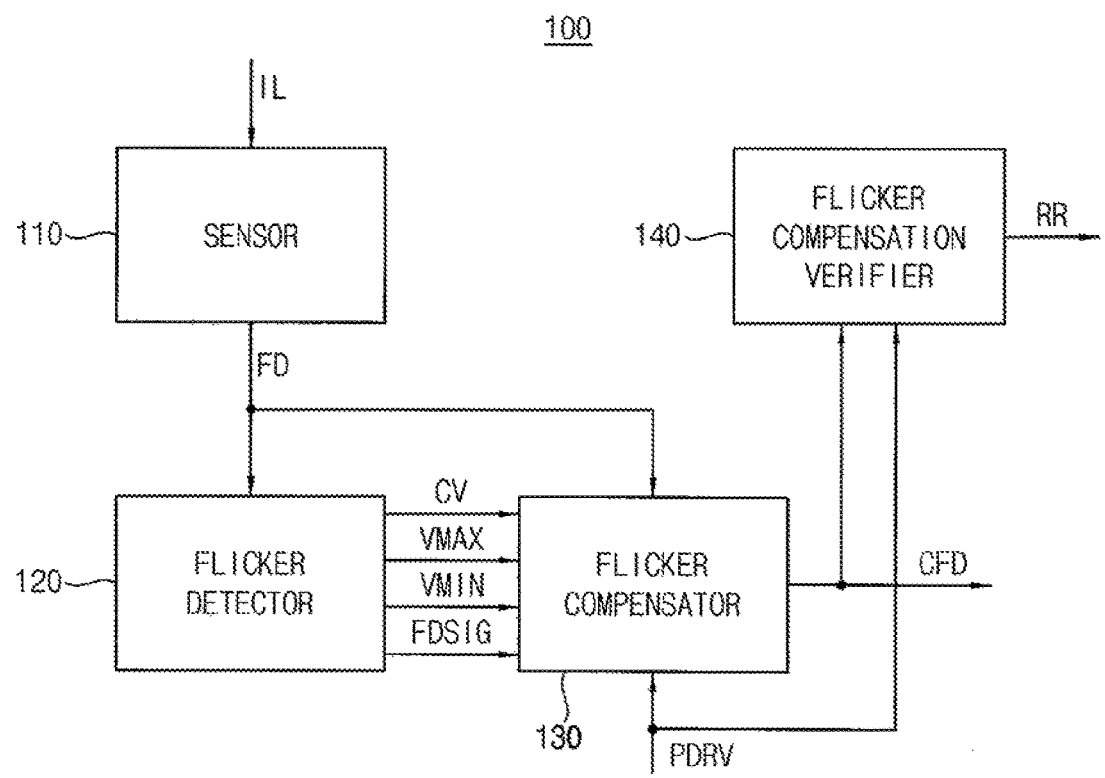
FIG. 1 is a block diagram illustrating an image sensor circuit according to exemplary embodiments of the present invention.

Various exemplary embodiments of the present invention will be described more fully hereinafter with reference to the accompanying drawings. The present disclosure may, however, be embodied in many different forms and should not be construed as limited to the exemplary embodiments set forth herein. In the drawings, the sizes and relative sizes of layers and regions may be exaggerated for clarity. Like numerals may refer to like elements throughout the specification and figures.

It will be understood that when an element is referred to as being "connected" or "coupled" to another element, it can be directly connected or coupled to the other element or intervening elements may be present.

FIG. 1 is a block diagram illustrating an image sensor circuit according to exemplary embodiments of the present invention.

Referring to FIG. 1, an image sensor circuit 100 may include a sensor 110, a flicker detector 120 and a flicker compensator 130.

The sensor 110 may be used to capture image data as a set of distinct image frames. In this regard, the sensor 110 may capture video frames. The sensor 110 may be incorporated into a digital camera, a camcorder, a webcam, a security camera, a television camera, or the like. It is to be understood that as the sensor 110 captures a sequence of image frames, there is a frequency to the operation of the sensor 110. For example, the sensor may capture 60 frames-per-second (fps) and so the frequency of the sensor 110 may be expressed as 60 Hz. However, the sensor 110 may capture frames at any other rate. For example, motion pictures are commonly recorded at 24 fps. Television has historically been captured at 60 fps but some televisions are capable of playing back video recorded at 120 fps or 240 fps, etc. and so the sensor 110 may be configured to any arbitrary frequency.

The sensor 110 may be said to capture incident light IL. Incident light is ambient light that is reflected by a subject or light that is generated by a subject and is then incident upon the image sensor 110. Ambient light may be generated from a synthetic source such as fluorescent bulbs or LED light, and synthetic sources for light, such as these, may operate with a particular frequency of activation and inactivation, for example, because they may receive power from a source that was originally an alternating current.

While in the ordinary course of using synthetic light, the frequency by which the light activates and deactivates may not be perceptible, under some circumstances, the frequency of the synthetic light may cause a flickering when captured as incident light IL by an image sensor 110 that captures image frames with its own frequency.

The sensor 110 may periodically generate frame data FD corresponding to incident light IL. In some example embodiments, when an intensity of the incident light IL changes with a first period and the sensor 110 outputs the frame data FD with a second period, the duration of the first period may be a multiple of the duration of the second period. For example, the first period may be 1/60 of a second and the second period may be 1/120, 1/240 or 1/480 of a second.

It is to be understood that in discussing the period of the incident light, this period is not meant to represent the wavelength of the incident light, rather, this period is the duration of time with which the incident light changes between a relatively high brightness and a relatively low brightness. This change in brightness may be produced by a strobing of an artificial light source, which may be commonly exhibited in artificial light sources such as LED and fluorescent bulbs. The inverse of this period is a frequency, but this frequency is similarly not the frequency of the incident light (i.e. its color), but rather the frequency with which the incident light changes between high-brightness and low brightness.

Figure 3:
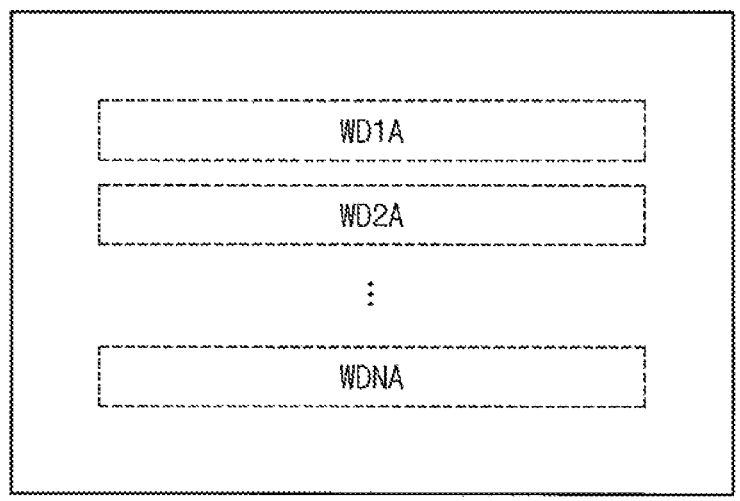
FIGS. 3 and 4 are diagrams illustrating examples of frame data of the image sensor circuit of FIG. 1.
Figure 4:
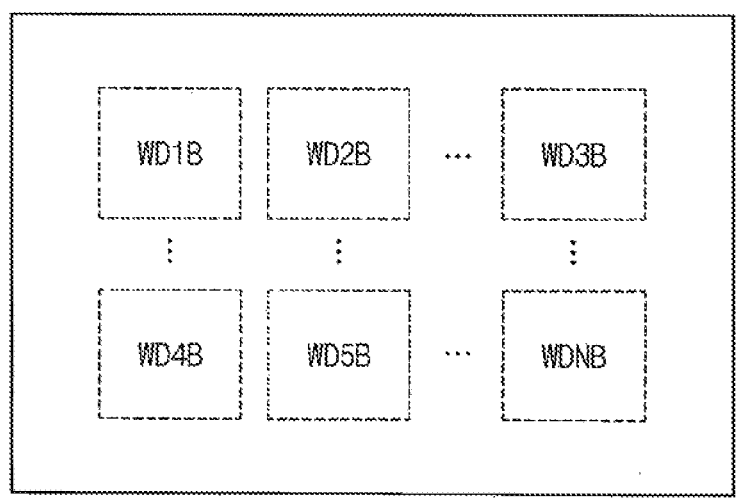

The flicker detector 120 may output a representative value of the frame data FD as a current value CV. The frame data FD may include first portion data through N-th portion data where N is an integer greater than 1, as illustrated in FIGS. 3 and 4. In some exemplary embodiments, the representative value may correspond to a first average value of the first portion data through an N-th average value of the N-th portion data, or an average value of the first average value of the first portion data through the N-th average value of the N-th portion data. In other example embodiments, the representative value may correspond to a first median value of the first portion data through an N-th median value of the N-th portion data, or a median value of the first median value of the first portion data through the N-th median value of the N-th portion data. The flicker detector 120 may generate a flicker detection signal FDSIG such that the flicker detection signal FDSIG is activated when the representative value of previous frame data is determined to change periodically between a minimum value VMIN and a maximum value VMAX. In some exemplary embodiments of the present invention, when an image is determined to be substantially different from that of previous frame data, the flicker detector 120 may search for new periodicity of the frame data FD based on several frames and generate a new flicker detection signal FDSIG based on the new periodicity. The flicker detector 120 may include registers for storing the representative values of the previously-input frame data FD.

The flicker compensator 130 may generate compensated frame data CFD by compensating the frame data FD based on the current value CV and a predetermined reference value PDRV when the flicker detection signal FDSIG is activated. When the intensity of the previous frame data is determined not to change periodically, the flicker detector 120 may deactivate the flicker detection signal FDSIG and the flicker compensator 130 may output the frame data FD as the compensated frame data CFD. For example, the flicker compensator 130 might not perform the compensation operation when the flicker detection signal FDSIG is deactivated. The flicker compensator 130 is described in greater detail below with reference to FIG. 2.

The image sensor circuit 100 may further include a flicker compensation verifier 140 that generates a flicker reduction rate RR by comparing a representative value of the compensated frame data CFD to the predetermined reference value PDRV. The flicker compensation verifier 140 may generate internally the representative value of the compensated frame data CFD in the same way as the flicker detector 120 generates the representative value of the frame data FD as the current value CV, as is described in greater detail below with reference to FIGS. 3 and 4.

In some exemplary embodiments of the present invention, the flicker reduction rate RR may be inversely proportional to a difference between the predetermined reference value PDRV and the representative value of the compensated frame data CFD. If the reduction of the flicker between the frames is performed effectively, the representative value of the compensated frame data CFD approaches the predetermined reference value PDRV and thus the flicker reduction ratio RR may have a relatively high value. In contrast, if the flicker reduction is not effective, the representative value of the compensated frame data CFD does not approach the predetermined reference value PDRV and the flicker reduction ratio RR has a relatively low value.

Figure 2:
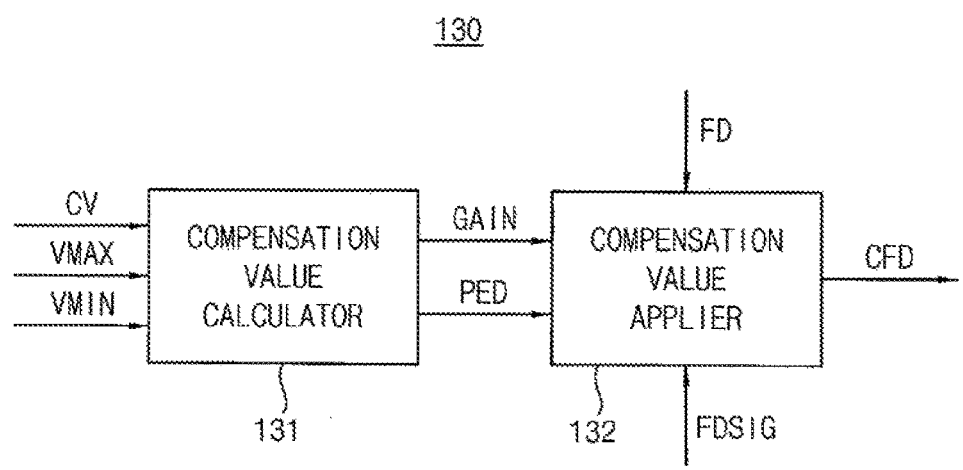
FIG. 2 is a block diagram illustrating a flicker compensator included in the image sensor circuit of FIG. 1.

FIG. 2 is a block diagram illustrating a flicker compensator included in the image sensor circuit of FIG. 1.

Referring to FIG. 2, the flicker compensator 130 may include a compensation value calculator 131 and a compensation value applier 132.

The compensation value calculator 131 may calculate a gain and an offset level compensation value that satisfy PDRV=CV*G+PED where PDRV is the predetermined reference value, CV is the current value, G is the gain and PED is the offset level compensation value. The exemplary operations of the compensation value calculator 131 are described below with reference to FIGS. 5 through 9.

The compensation value applier 132 may calculate and output R (red), G (green) and B (blue) pixel data included in the compensated frame data CFD. This pixel data may be calculated by the compensation value applier 132 by multiplying the gain with each of R, G and B data included in the frame data FD and then adding the offset level compensation value PED. For example, the compensation value applier 132 may apply the gain and the offset level compensation value PED to each R pixel data in the frame data FD to generate each R pixel data in the compensated frame data CFD, apply the gain and the offset level compensation value PED to each G pixel data in the frame data FD to generate each G pixel data in the compensated frame data CFD, and apply the gain and the offset level compensation value PED to each B pixel data in the frame data FD to generate each B pixel data in the compensated frame data CFD.

In some exemplary embodiments, the predetermined reference value PDRV may be a value between the minimum value VMIN and the maximum value VMAX. The example operations of the compensation value calculator 131 will be described below with reference to FIGS. 5 through 9. Exemplary operations of the compensation value calculator 131, when the predetermined reference value PDRV corresponds to the maximum value VMAX, are described below with reference to FIGS. 5 and 6. Exemplary operations of the compensation value calculator 131, when the predetermined reference value PDRV corresponds to the minimum value VMIN, are described below with reference to FIGS. 7 and 8. Exemplary operations of the compensation value calculator 131, when the predetermined reference value PDRV corresponds to an intermediate value between the minimum value VMIN and the maximum value VMAX, are described below with reference to FIG. 9.

FIGS. 3 and 4 are diagrams illustrating examples of frame data of the image sensor circuit of FIG. 1.

Referring to FIG. 3, the frame data FD1 may include first portion data through N-th portion data. The first portion data through the N-th portion data in the frame data FD1 may correspond to first through N-th data windows WD1A, through WDNA in the frame, respectively. For example, the first through N-th data windows WD1A through WDNA may be arranged vertically on the frame data FD1, as illustrated in FIG. 3. Each of the first through N-th portion data may include a plurality of pixel data and each pixel data may include the R, G and B pixel data.

In some exemplary embodiments of the present invention, excessively bright or dark portion data among the first through N-th portion data may be excluded in searching for the periodicity of the frame data FD1. Portion data may be considered "excessively bright or dark" where its data values exceed predetermined thresholds.

In some exemplary embodiments of the present invention, the representative value of the frame data FD1 may be calculated as one arbitrary value of a first average value of the first portion data through an N-th average value of the N-th portion data. In other exemplary embodiments of the present invention, the representative value of the frame data FD1 may be calculated as an average value of the first average value of the first portion data through the N-th average value of the N-th portion data.

In some exemplary embodiments of the present invention, the representative value of the frame data FD1 may be calculated as one arbitrary value of a first median value of the first portion data through an N-th median value of the N-th portion data. In other exemplary embodiments of the present invention, the representative value of the frame data FD1 may be calculated as a median value of the first average value of the first portion data through the N-th average value of the N-th portion data.

Referring to FIG. 4, the frame data FD2 may include first portion data through N-th portion data. The first portion data through the N-th portion data in the frame data FD2 may correspond to first through N-th data windows WD1B through WDNB in the frame, respectively. For example, the first through N-th data windows WD1B through WDNB may be arranged in a matrix form of rows and columns on the frame data FD1 as illustrated in FIG. 4. Each of the first through N-th portion data may include a plurality of pixel data and each pixel data may include the R, G and B pixel data.

In some exemplary embodiments of the present invention, the representative value of the frame data FD2 may be calculated as an arbitrary value of a first average value of the first portion data through an N-th average value of the N-th portion data. In other exemplary embodiments of the present invention, the representative value of the frame data FD2 may be calculated as an average value of the first average value of the first portion data through the N-th average value of the N-th portion data.

In some exemplary embodiments of the present invention, the representative value of the frame data FD2 may be calculated as an arbitrary value of a first median value of the first portion data through an N-th median value of the N-th portion data. In other exemplary embodiments of the present invention, the representative value of the frame data FD2 may be calculated as a median value of the first average value of the first portion data through the N-th average value of the N-th portion data.

Figure 5:
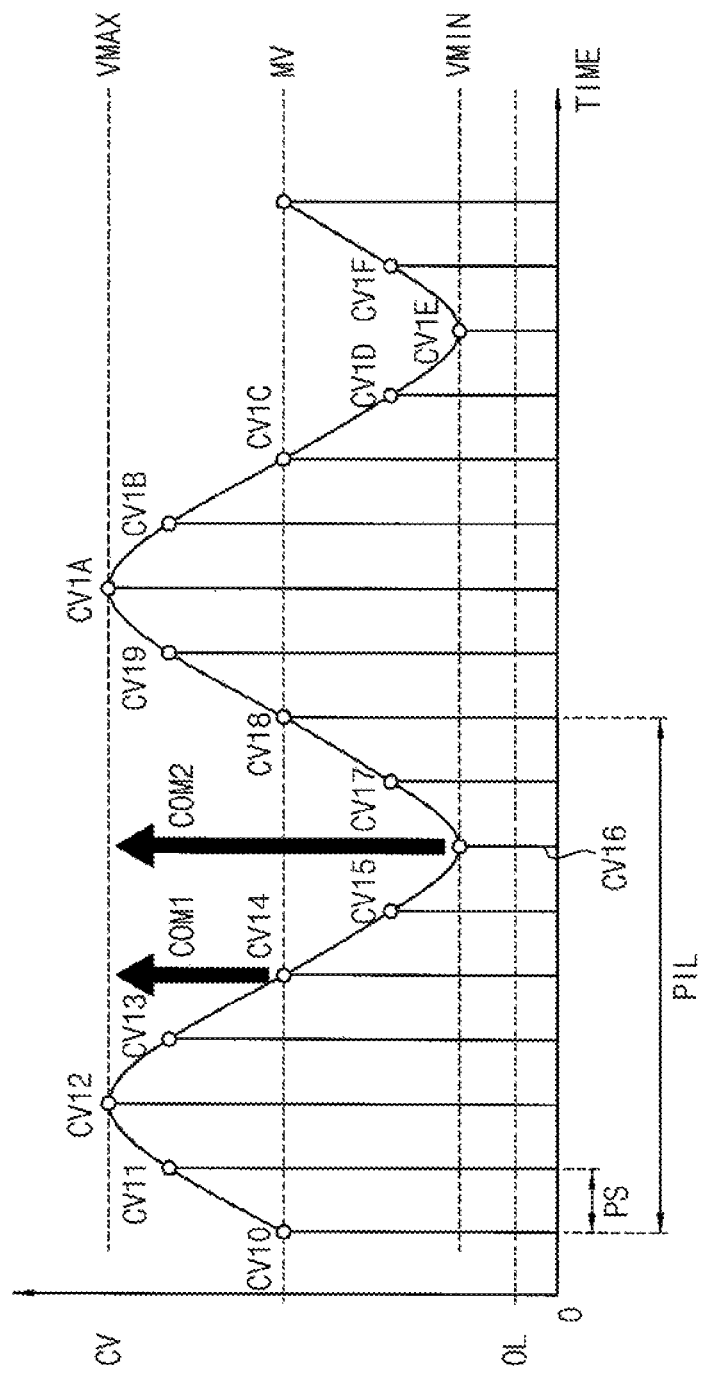
FIGS. 5 and 6 are diagrams illustrating an exemplary operation of a compensation value calculator included in the flicker compensator of FIG. 2.
Figure 6:
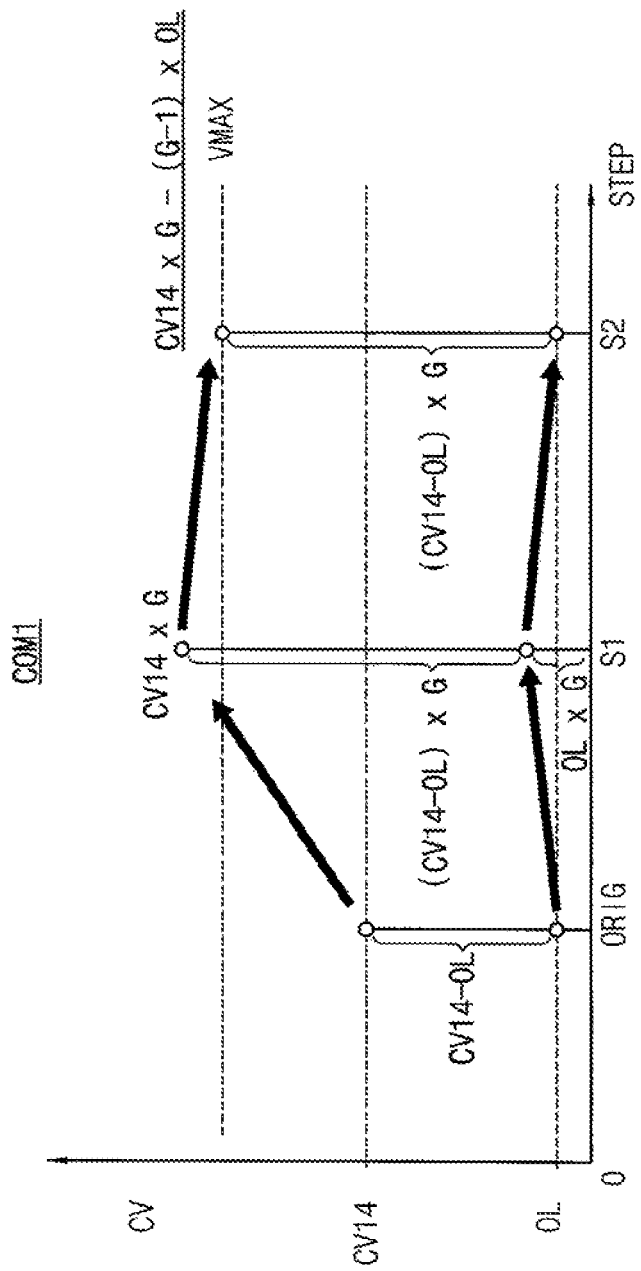

FIGS. 5 and 6 are diagrams illustrating an exemplary operation of a compensation value calculator included in the flicker compensator of FIG. 2.

FIG. 5 illustrates a case in which the intensity of the incident light IL varies with the first period PIL and the sensor 110 generate the frame data FD with second period PS. For example, a duration of the first period PIL may be eight times longer than a duration of the second period PS, as illustrated in FIG. 5. As such, if the duration of the first period PIL is set to be a multiple of the duration of the second period. PS, the periodical change of the representative values CV10 through CV1F of the previous frame data may be detected.

It is to be understood that indicating that the period of the incident light being a multiple of the period of the frame data is analogous to saying that the frequency of the frame data is a multiple of the frequency of the incident light changing between high and low values.

FIG. 5 illustrates an exemplary operation of the compensation value calculator 131 when the predetermined reference value PDRV corresponds to the maximum value VMAX. The flicker detector 120 may activate the flicker detection signal FDSIG as a result of the current value CV changing, with the first period PIL, between the minimum value VMIN and the maximum value VMAX.

For example, when the fourth frame data are input as the frame data FD, the flicker detector 120 outputs the fourth value C14 as the current value CV. The forth value CV14 is lower than the predetermined reference value PDRV, (the maximum value VMAX), and so the flicker compensator 130 may generate the gain G and the offset level compensation value PED so that the intensity of the fourth frame data may be compensated or increased by an amount COM1 to allow the frame data to approach the predetermined reference value PDRV, as is described below with reference to FIG. 6.

For example, when the sixth frame data are input as the frame data FD, the flicker detector 120 outputs the sixth value C16 as the current value CV. The sixth value CV16 is lower than the predetermined reference value PDRV (the maximum value VMAX), and so the flicker compensator 130 may generate the gain G and the offset level compensation value PED so that the intensity of the sixth frame data may be compensated or increased by an amount COM2 to allow the frame data to approach the predetermined reference value PDRV, as is described below with reference to FIG. 6.

FIG. 6 illustrates a method by which the compensation value calculator 131 calculates the gain G and the offset level compensation value PED using the fourth value C14 and the predetermined reference value PDRV (the maximum value VMAX). The current value CV may have an offset level OL that is the representative value of the frame data FD when the frame data FD correspond to a totally dark color. The offset level OL is changed when the fourth value C14 is multiplied by the gain G and thus the offset level compensation value PED is added to the multiplied value.

The compensation value calculator 131 may perform an original calculation of ORIG to find CV14−OL, a multiplying calculation S1 to find (CV14−OL)×G, and an offset calculation S2 to find CV14×G−(G−1)×OL. The compensation value calculator 131 may calculate the gain G and the offset level compensation value PED by an equation such as CV14×G−(G−1)×OL=VMAX. The offset level compensation value PED corresponds to −(G−1)×OL. In an exemplary embodiment of the present invention, the predetermined reference value PDRV may be an intermediate value between 90% of the maximum value VMAX and 95% of the maximum value VMAX.

Figure 7:
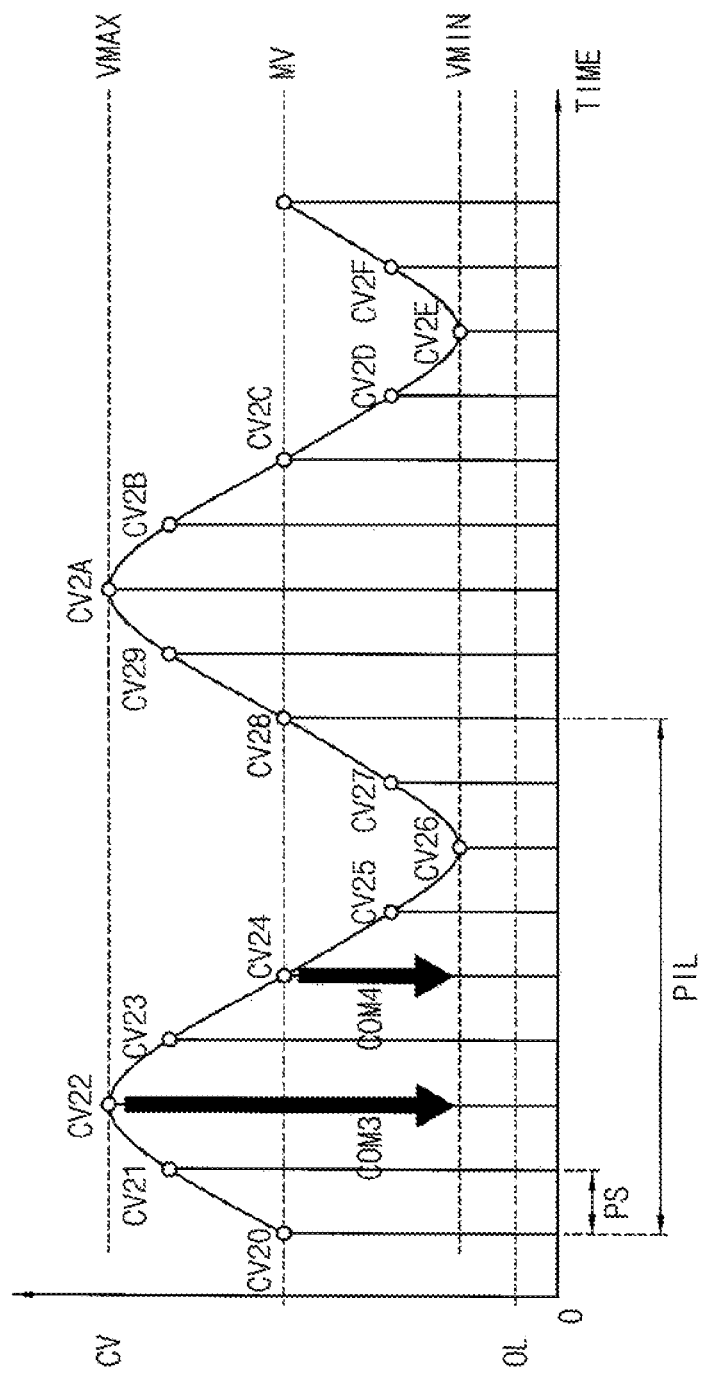
FIGS. 7 and 8 are diagrams illustrating an exemplary operation of the compensation value calculator included in the flicker compensator of FIG. 2.
Figure 8:
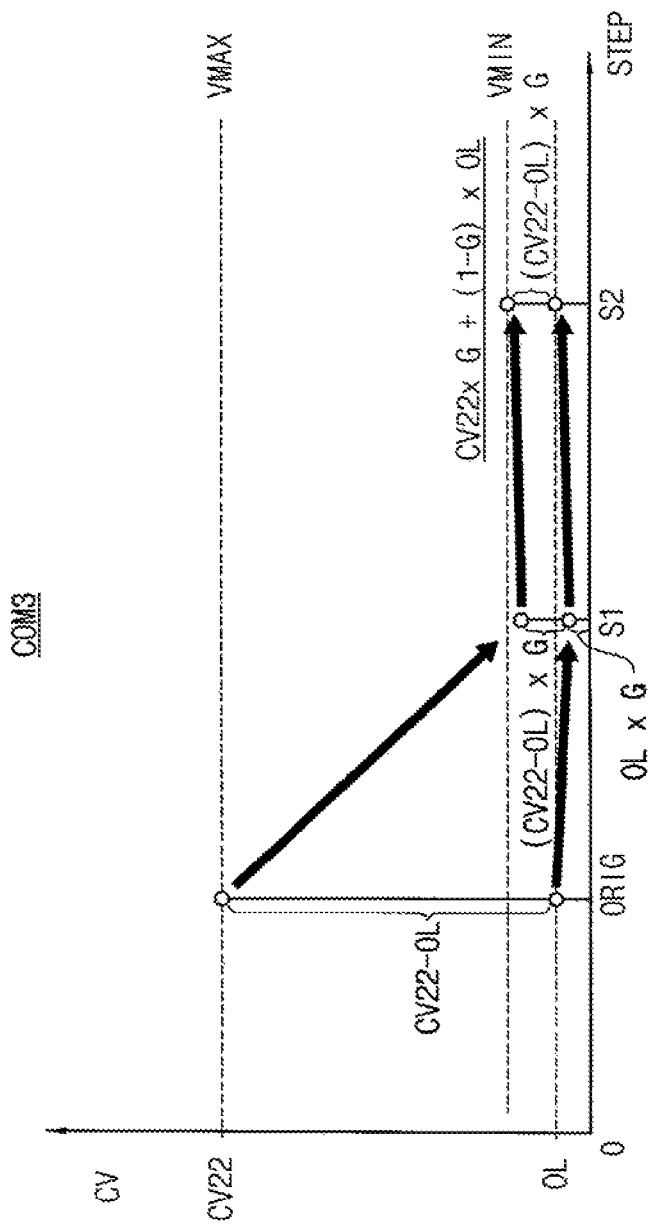

FIGS. 7 and 8 are diagrams illustrating an exemplary operation of the compensation value calculator included in the flicker compensator of FIG. 2.

FIG. 7 illustrates a case in which the intensity of the incident light IL varies with the first period PIL and the sensor 110 generate the frame data FD in a second period. PS. For example, a duration of the first period PIE may be eight times as long as a duration of the second period PS, as illustrated in FIG. 7. As such, if a duration of the first period PIL is set to be a multiple of a duration of the second period PS, the periodical change of the representative values CV20 through CV2F of the previous frame data may be detected.

FIG. 7 illustrates an exemplary operation of the compensation value calculator 131 when the predetermined reference value PDRV corresponds to the minimum value VMIN. The flicker detector 120 may activate the flicker detection signal FDSIG as a result of the current value CV changing with the first period PIL between the minimum value VMIN and the maximum value VMAX.

For example, when the second frame data are input as the frame data FD, the flicker detector 120 outputs the second value C22 as the current value CV. The second value CV22 is higher than the predetermined reference value PDRV (the minimum value VMIN), and so the flicker compensator 130 may generate the gain S and the offset level compensation value PED so that the intensity of the second frame data may be compensated or decreased by an amount COM3 to approach the predetermined reference value PDRV, as is described below with reference to FIG. 8.

For example, when the fourth frame data are input as the frame data FD, the flicker detector 120 outputs the fourth value C24 as the current value CV. The fourth value CV24 is higher than the predetermined reference value PDRV (the minimum value VMIN), and so the flicker compensator 130 may generate the gain G and the offset level compensation value PED so that the intensity of the fourth frame data may be compensated or decreased by an amount COM4 to approach the predetermined reference value PDRV in the same way as will be described with reference to FIG. 8.

FIG. 8 illustrates a method that the compensation value calculator 131 calculates the gain G and the offset level compensation value PED using the second value C22 and the predetermined reference value PDRV (the minimum value VMIN). The current value CV may have an offset level OL that is the representative value of the frame data FD when the frame data FD correspond to a totally dark color. The offset level OL is changed when the second value C22 is multiplied by the gain G and thus the offset level compensation value PED is added to the multiplied value.

The compensation value calculator 131 may perform an original calculation ORIG to find CV22−OL, a multiplying calculation S1 to find (CV22−OL)×G and an offset calculation S2 to find CV22×G+(1−G)×OL. The compensation value calculator 131 may calculate the gain G and the offset level compensation value PED by according to the equation CV22×G+(1−G)×OL=VMIN. The offset level compensation value PED corresponds to (1−G)×OL.

Figure 9:
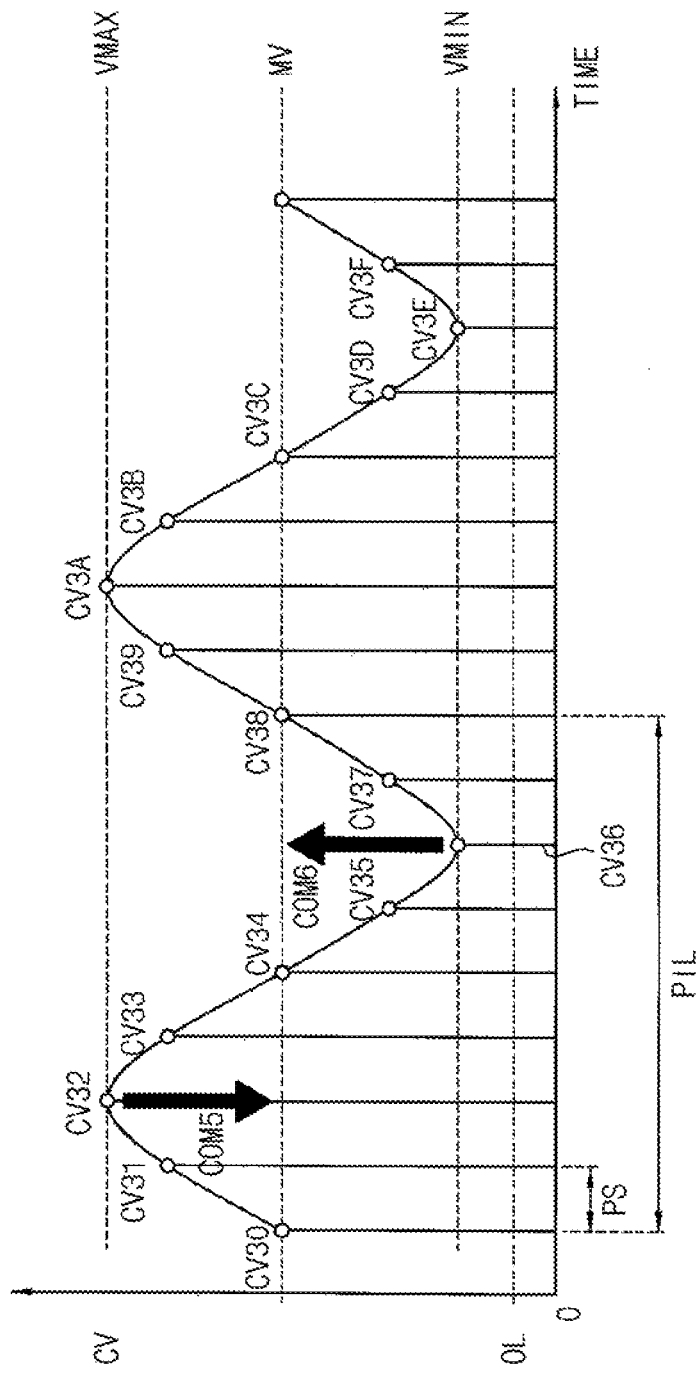
FIG. 9 is a diagram illustrating an exemplary operation of the compensation value calculator included in the flicker compensator of FIG. 2.

FIG. 9 is a diagram for describing an exemplary operation of the compensation value calculator included in the flicker compensator of FIG. 2.

FIG. 9 illustrates a case in which the intensity of the incident light IL varies with the first period PIL, and the sensor 110 generates the frame data FD in the second period PS. For example, a duration of the first period PIL may be eight times greater than a duration of the second period PS, as illustrated in FIG. 9. As such, if a duration of the first period PIL is set to be a multiple of a duration of the second period PS, the periodical change of the representative values CV30 through CV3F of the previous frame data may be detected.

FIG. 9 illustrates an example operation of the compensation value calculator 131 when the predetermined reference value PDRV corresponds to a mean value MV of the minimum value VMIN and the maximum value VMAX. The flicker detector 120 may activate the flicker detection signal FDSIG as a result of the current value CV changing with the first period PIL, between the minimum value VMIN and the maximum value VMAX.

For example, when the second frame data are input as the frame data FD, the flicker detector 120 outputs the second value C32 as the current value CV. The second value CV22 is higher than the predetermined reference value PDRV (the mean value MV), and so the flicker compensator 130 may generate the gain G and the offset level compensation value PED so that the intensity of the second frame data may be compensated or decreased by an amount COM5 to approach the predetermined reference value PDRV, in a manner similar to that described above with reference to FIG. 8.

For example, when the sixth frame data are input as the frame data FD, the flicker detector 120 outputs the sixth value C36 as the current value CV. The sixth value CV36 is higher than the predetermined reference value PDRV (the mean value MV), and so the flicker compensator 130 may generate the gain G and the offset level compensation value PED so that the intensity of the fourth frame data may be compensated or increased by an amount COM6 to approach the predetermined reference value PDRV, in a manner similar to that way described above with reference to FIG. 6.

Figure 10:
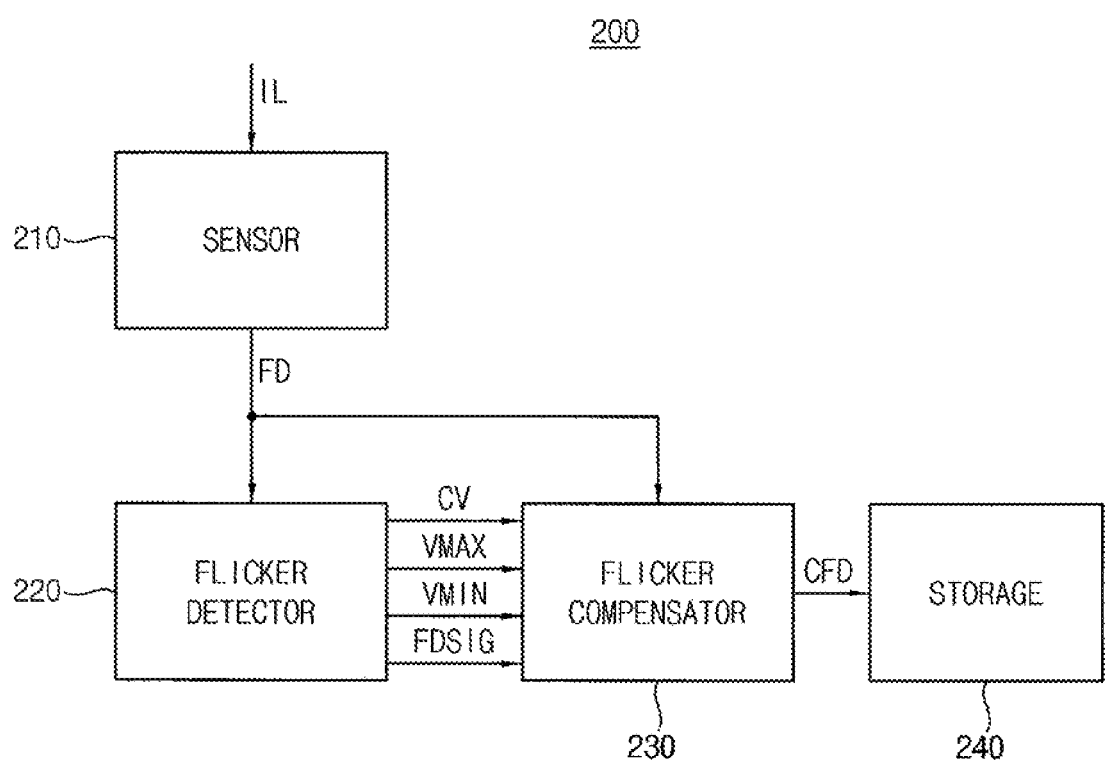
FIG. 10 is a block diagram illustrating a camera device according to exemplary embodiments of the present invention.

FIG. 10 is a block diagram illustrating a camera device according to exemplary embodiments of the present invention.

Referring to FIG. 10, a camera device 200 may include a sensor 210, a flicker detector 220, a flicker compensator 230 and a storage memory 240.

The sensor 210 may periodically generate frame data FD corresponding to incident light IL. The flicker detector 220 may output a representative value of the frame data FD as a current value CV. The flicker detector 220 may generate a flicker detection signal FDSIG such that the flicker detection signal FDSIG is activated when the representative value of previous frame data exhibits a periodic change between a minimum value VMIN and a maximum value VMAX. The flicker compensator 230 may generate compensated frame data CFD by compensating the frame data based on the current value CV and a predetermined reference value PDRV when the flicker detection signal FDSIG is activated. The storage memory 240 may store the compensated frame data CFD.

In some exemplary embodiments of the present invention, the intensity of the incident light IL may change with a first period, the sensor 210 may output the frame data FD within a second period and a duration of the first period is a multiple of a duration of the second period.

In some exemplary embodiments of the present invention, the flicker compensator 230 may include a compensation value calculator and a compensation value applier. The compensation value calculator may calculate a gain and an offset level compensation value that satisfy PDRV=CV*G+PED where PDRV is the predetermined reference value, CV is the current value, G is the gain, and PED is the offset level compensation value. The compensation value applier may output R, G and B pixel data included in the compensated frame data CFD by multiplying the gain with each of R, G and B data included in the frame data FD and then adding the offset level compensation value to the multiplied value.

The sensor 210, the flicker detector 220 and the flicker compensator 230 may be substantially the same as the sensor 110, the flicker detector 120 and the flicker compensator 130 included in the image sensor circuit 100 of FIG. 1, respectively.

Figure 11:
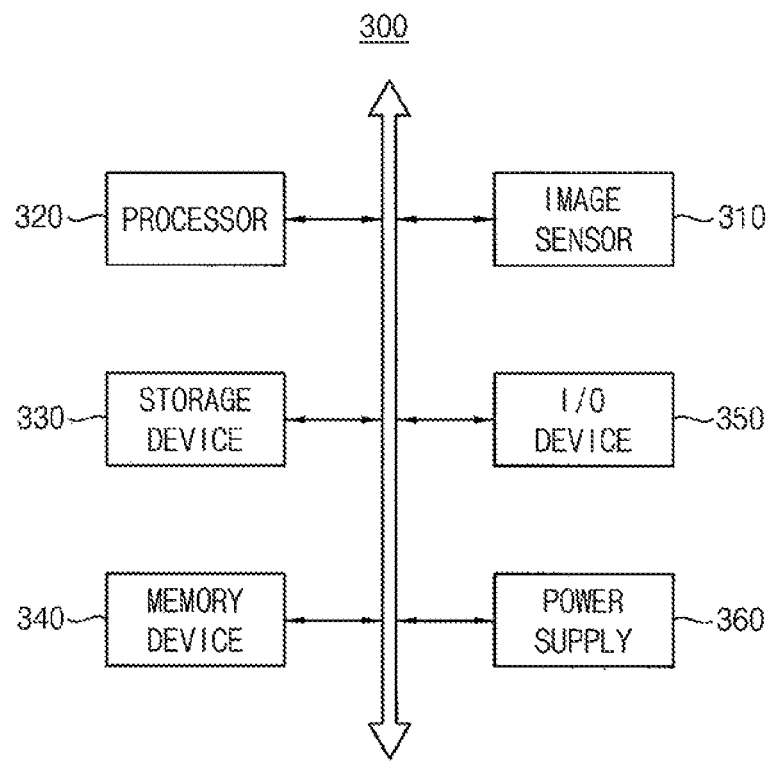
FIG. 11 is a block diagram illustrating a computing system according to exemplary embodiments of the present invention.

FIG. 11 is a block diagram illustrating a computing system according to exemplary embodiments of the present invention.

Referring to FIG. 11, a computing system 300 may include an image sensor 310, a processor 320 and a storage device 330.

The image sensor 310 may generate a digital signal corresponding to an incident light. The storage device 330 may store the digital signal. The processor 320 may control operations of the image sensor 310 and the storage device 330.

The computing system 300 may further include a memory device 340, an input/output device 350 and a power supply 360. Although it is not illustrated in FIG. 11, the computing system 300 may further include ports or bus connections that communicate with a video card, a sound card, a memory card, a universal serial bus (USB) device, or other electronic devices.

It is to be understood that the power supply 360 is not connected to the other illustrated components over the data bus, and rather, the power supply may supply power to the other illustrated components along a separate power bus.

The processor 320 may perform various calculations or tasks. According to some embodiments, the processor 320 may be a microprocessor and/or a CPU. The processor 320 may be a dedicated digital signal processor. The processor 320 may communicate with the storage device 330, the memory device 340 and the input/output device 350 via an address bus, a control bus, and/or a data bus. In some exemplary embodiments of the present invention, the processor 320 may be coupled to an extended bus, such as a peripheral component interconnection (PCI) bus.

The storage device 330 may include a non-volatile memory device such as a flash memory device, a solid state drive (SSD), a hard disk drive (HDD), a compact disk read-only memory (CD-ROM) drive, etc.

The memory device 340 may store data required for an operation of the computing system 300. The memory device 340 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 350 may include a keyboard, a mouse, a printer, a touchscreen, a jog dial, a control panel, a display device, etc. The power supply 360 may supply operational power.

The image sensor 310 may be connected to the processor 320 through one or more of the above buses or other communication links to communicate with the processor 320. The image sensor 310 may include a pixel array that detects incident light to generate an analog signal, and an analog-digital conversion unit that performs a sigma-delta analog-digital conversion and a cyclic analog-digital conversion with respect to the analog signal to generate a digital signal in a first operation mode and performs a single-slope analog-digital conversion with respect to the analog signal to generate the digital signal in a second operation mode.

The image sensor 310 may have a configuration equal to or similar to the image sensor circuit 100 of FIG. 1. The operation and the configuration of the image sensor 310 may be the same as described above with reference to FIGS. 1 through 9.

The image sensor 310 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

According to exemplary embodiments of the present invention, the image sensor 310 may be integrated with the processor 320 in one chip, or the image sensor 310 and the processor 320 may be implemented as separate chips.

The computing system 300 may be any computing system using an image sensor. For example, the computing system 300 may include a digital camera, a webcam, a camcorder, a drone, a mobile phone, a smart phone, a portable multimedia player (PMP), a personal digital assistant (PDA), etc.

Figure 12:
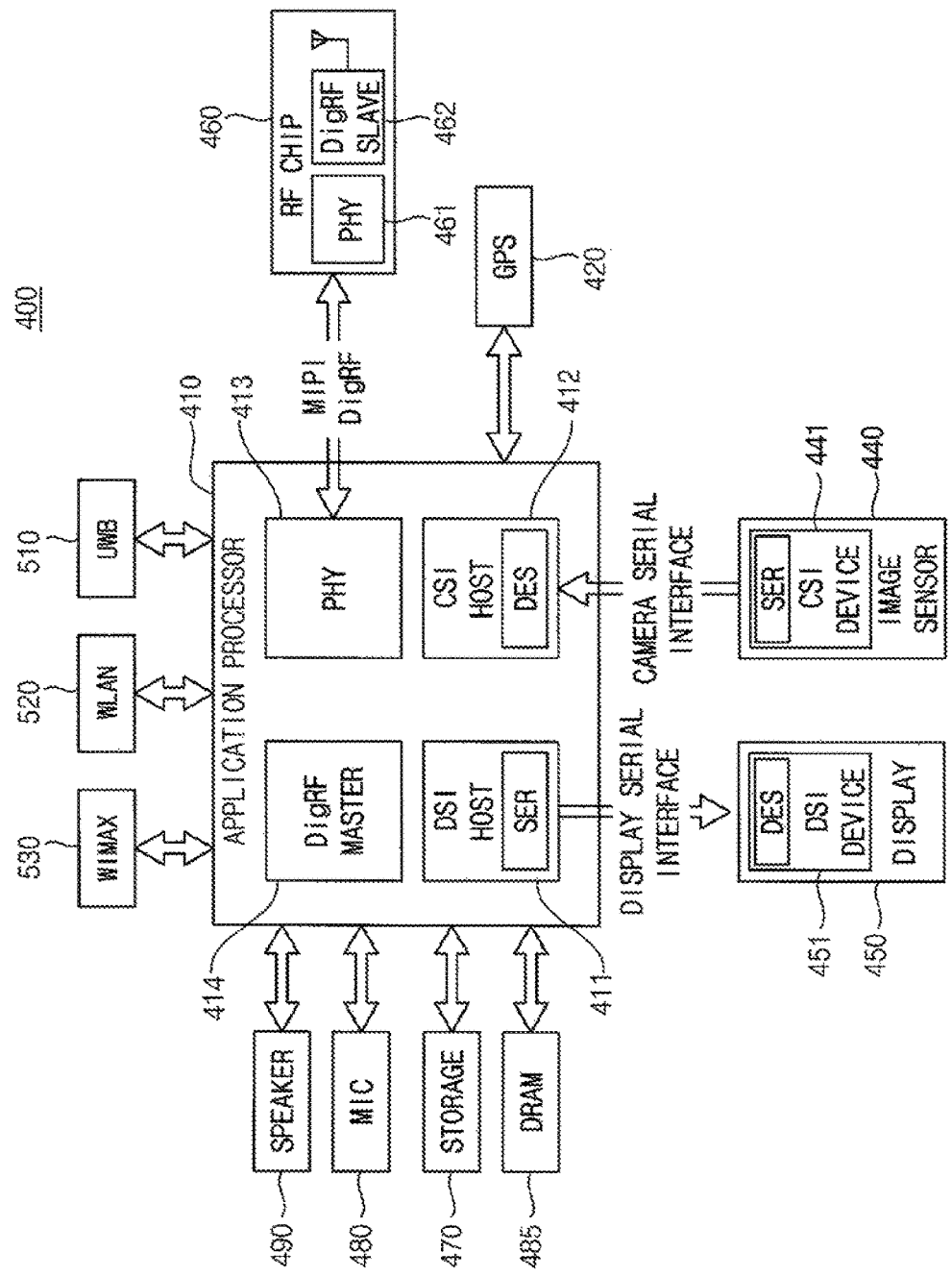
FIG. 12 is a block diagram illustrating an example of an interface used in the computing system of FIG. 11.

FIG. 12 is a block diagram illustrating an example of an interface used in the computing system of FIG. 11.

Referring to FIG. 12, a computing system 400 may be implemented by a data processing device (e.g., a cellular phone, a personal digital assistant, a portable multimedia player, a smart phone, etc.) that uses or supports a mobile industry processor interface (MIPI) interface. The computing system 400 may include an application processor 410, an image sensor 440, a display device 450, etc.

A CSI host 412 of the application processor 410 may perform a serial communication with a CSI device 441 of the image sensor 440 via a camera serial interface (CSI). In some embodiments, the CSI host 412 may include a deserializer (DES), and the CSI device 441 may include a serializer (SER). A DSI host 411 of the application processor 410 may perform a serial communication with a DSI device 451 of the display device 450 via a display serial interface (DSI). In some exemplary embodiments of the present invention, the DSI host 411 may include a serializer (SER), and the DSI device 451 may include a deserializer (DES).

The image sensor 440 may have a configuration equal to or similar to the image sensor circuit 100 of FIG. 1. The operation and the configuration of the image sensor 440 may be the same as or similar to the approach described above with reference to FIGS. 1 through 9.

The computing system 400 may further include a radio frequency (RF) chip 460 performing a communication with the application processor 410. A physical layer (PHY) 413 of the computing system 400 and a physical layer (PHY) 461 of the RF chip 460 may perform data communications based on a MIPI DigRF. The application processor 410 may further include a DigRF MASTER 414 that controls the data communications according to the MIPI DigRF of the PHY 461, and the RF chip 460 may further include a DigRF SLAVE 462 controlled by the DigRF MASTER 414.

The computing system 400 may further include a global positioning system (GPS) 420, a storage memory 470, a microphone MIC 480, a DRAM device 485, and a speaker 490. In addition, the computing system 400 may perform communications using an ultra wideband (UWB) radio 510, a wireless local area network (WLAN) 520, a worldwide interoperability for microwave access (WIMAX) 530, etc. However, the structure and the interface of the computing system 400 are not limited thereto.

The exemplary embodiments of the present invention may be applied to any devices and systems including an image sensor circuit. For example, exemplary embodiments of the present invention may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing disclosure is illustrative of exemplary embodiments of the present invention and is not to be construed as limiting. Although a few exemplary embodiments of the present invention have been described, those skilled in the art will readily appreciate that many modifications are possible in the example embodiments without materially departing from the novel teachings and aspects of the present disclosure.

What is claimed is:

1. An image sensor circuit comprising:
   an image sensor configured to generate frame data for a plurality of successive frames;
   a flicker detector circuit configured to determine a representative value of the frame data for each of the plurality of successive frames and generate a flicker detection signal that is activated when the determined representative values of the generated frame data show periodicity between a minimum value and a maximum value; and
   a flicker compensator circuit configured to generate compensated frame data by compensating the frame data based on the determined representative values and a predetermined reference value when the flicker detection signal is activated, wherein the predetermined reference value is established based on the generated frame data, and wherein the flicker compensator circuit includes:

a compensation value calculator circuit configured to calculate a gain and an offset level compensation value that satisfy PDRV=CV*G+PED where PDRV is the predetermined reference vale, CV is frame data for a current frame, G is the gain and PED is the offset level compensation value; and a compensation value applier circuit configured to output Red, Green and Blue pixel data included in the compensated frame data by multiplying the gain to each of Red, Green and Blue data included in the frame data and then adding the offset level compensation value.

2. The image sensor circuit of claim 1, further comprising: a flicker compensation verifier circuit configured to determine a flicker reduction rate by determining a representative value of the compensated frame data, and comparing the determined representative value of the compensated frame data with the predetermined reference value.

3. The image sensor circuit of claim 2, wherein the flicker reduction rate is inversely proportional to a difference between the predetermined reference value and the determined representative value of the compensated frame data.

4. The image sensor circuit of claim 1, wherein the image sensor generates the frame data based on incident light and an intensity of the incident light changes at a first frequency, the sensor outputs the frame data at a second frequency, and the second frequency is a multiple of the first frequency.

5. The image sensor circuit of claim 1, wherein the predetermined reference value corresponds to the maximum value, the minimum value or a value between the maximum value and the minimum value.

6. The image sensor circuit of claim 5, wherein the predetermined reference value is between 90% of the maximum value and 95% of the maximum value.

7. The image sensor circuit of claim 1, wherein the frame data include portion data and the representative value corresponds to an average value of the portion data.

8. The image sensor circuit of claim 1, wherein the frame data include first portion data through N-th portion data where N is an integer greater than 1, and the representative value corresponds to an average value of a first average value of the first portion data through an N-th average value of the N-th portion data.

9. The image sensor circuit of claim 1, wherein the frame data include portion data and the representative value corresponds to a median value of the portion data.

10. The image sensor circuit of claim 1, wherein the frame data include first portion data through N-th portion data where N is an integer greater than 1, and the representative value corresponds to a median value of a first median value of the first portion data through an N-th median value of the N-th portion data.

11. The image sensor circuit of claim 1, wherein the flicker compensator circuit outputs the frame data as the compensated frame data when the flicker detection signal is deactivated.

12. A camera device comprising:

a sensor configured to generate frame data corresponding to incident light at a predetermined frame rate, the generated frame data including values for a plurality of frames;

a flicker detector circuit configured to determine a representative value of the frame data for each of the plurality of frames and generate a flicker detection signal that is activated when the determined representative values of the generated frame data show periodicity between a minimum value and a maximum value;

a flicker compensator circuit configured to generate compensated frame data by compensating the frame data based on the determined representative values and a predetermined reference value when the flicker detection signal is activated;

a flicker compensation verifier circuit configured to determine a flicker reduction rate by determining a representative value of the compensated frame data, and comparing the determined representative value of the compensated frame data with the predetermined reference value; and a storage configured to store the compensated frame data, wherein the flicker reduction rate is inversely proportional to a difference between the predetermined reference value and the determined representative value of the compensated frame data.

13. The camera device of claim 12, wherein the sensor generates the frame data based on incident light and an intensity of the incident light changes at a frequency, and the predetermined frame rate is a multiple of the frequency.

14. The camera device of claim 12, wherein the flicker compensator circuit includes:

a compensation value calculator circuit configured to calculate a gain and an offset level compensation value that satisfy PDRV=CV*G+PED where PDRV is the predetermined reference value, CV is frame data for a current frame, G is the gain and PED is the offset level compensation value; and a compensation value applier circuit configured to output Red, Green and Blue pixel data included in the compensated frame data by multiplying the gain to each of Red, Green and Blue data included in the frame data and then adding the offset level compensation value.

15. A mobile electronic device, comprising:

an image sensor capturing motion as a sequence of image frames;

a comparator for comparing the image frames of the sequence of image frames to determine whether there is a periodic change in image frame intensity within the sequence of image frames; and a compensator circuit for compensating the sequence of image frames to remove the periodic change in image frame intensity when the comparator determines that there is a periodic change in image frame intensity within the sequence of image frames by compensating the sequence of image frames based on determined representative values calculated for each frame of the sequence of image frames and a predetermined reference value, when a flicker detection signal is activated, wherein the predetermined reference value is between 90% of a maximum value of the sequence of image frames and 95% of the maximum value of the sequence of image frames.

16. The mobile electronic device of claim 15, wherein the comparator determining whether there is a periodic change in the image frame intensity within the sequence of image frames, comprises:

calculating the representative values for each image frame of the sequence of image frames, the representative value representing a total or average brightness for the each image frame;

comparing the calculated representative values to determine a frame-to-frame change; and analyzing the frame-to-frame changes to identify a repeating pattern.

17. The mobile electronic device of claim 15, wherein the compensator circuit compensates the sequence of image frames by changing brightness of the sequence of image frames.

18. The mobile electronic device of claim 15, further comprising:
   a microprocessor;
   a display panel; and
   at least one radio transceiver.

19. The mobile electronic device of claim 15, wherein the image sensor captures motion as a sequence of image frames at a predetermined frame rate by digitizing incident light, the incident light including artificially generated light that strobes at a predetermined frequency that is different from the predetermined frame rate.

20. The image sensor circuit of claim 1, wherein the predetermined reference value is equal to a median value of a plurality of portions of the generated frame data.

\* \* \* \* \*